United States Patent [19]

Nagai

[11] Patent Number: 5,145,963
[45] Date of Patent: Sep. 8, 1992

[54] OPTICAL INFORMATION RECORDING MEDIUM AND NICKEL DITHIOLATE COMPLEX COMPOUNDS EMPLOYED IN THE SAME

[75] Inventor: Kazukiyo Nagai, Numazu, Japan
[73] Assignee: Ricoh Company, Ltd., Tokyo, Japan
[21] Appl. No.: 584,917
[22] Filed: Sep. 18, 1990

Related U.S. Application Data

[62] Division of Ser. No. 420,020, Oct. 11, 1989, Pat. No. 5,013,634.

[30] Foreign Application Priority Data

Oct. 12, 1988 [JP] Japan .................. 63-258170
Nov. 16, 1988 [JP] Japan .................. 63-289353

[51] Int. Cl.$^5$ ............... C07D 213/70; G01D 9/00; B32B 13/02; G03C 1/00
[52] U.S. Cl. ........................................... 546/6
[58] Field of Search ......................................... 546/6

[56] References Cited

FOREIGN PATENT DOCUMENTS 59-78341 5/1984 Japan ................... 430/495

*Primary Examiner*—Mark L. Berch
*Attorney, Agent, or Firm*—Oblon, Spivak, McClelland, Maier & Neustadt

[57] ABSTRACT

An optical information recording medium is disclosed, which comprises a substrate and an organic recording layer formed thereon comprising a polymethine dye and a dithiolate transition metal complex compound having formula (I):

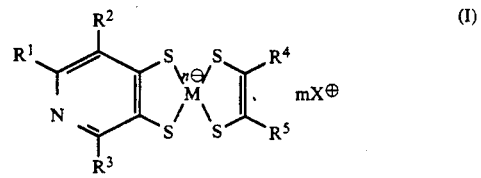

wherein $R^1$, $R^2$ and $R^3$ each independently represent hydrogen, a halogen, an alkyl group having 1 to 6 carbon atoms, or a perfluoroalkyl group having 1 to 6 carbon atoms; $R^4$ and $R^5$ each independently represent hydrogen, an alkyl group having 1 to 6 carbon atoms, an aryl group or a cyano group, which may form a heterocyclic ring; X represents a cation; M represents a transition metal; n is an integer of 0 to 2, which represents the valence number of the transition metal; and m represents the number of cations, which is an integer of 0 to 2, corresponding to the valence number of the transition metal. Furthermore, novel dithiolate nickel complex compounds for use in the optical information recording medium are disclosed.

5 Claims, 5 Drawing Sheets

OPTICAL INFORMATION RECORDING MEDIUM AND NICKEL DITHIOLATE COMPLEX COMPOUNDS EMPLOYED IN THE SAME

This is a division of application Ser. No. 07/420,020, filed on Oct. 11, 1989, now U.S. Pat. No. 5,013,634.

BACKGROUND OF THE INVENTION

1. Field of the Invention

The present invention relates to an optical information recording medium and dithiolate transition metal complex compounds employed in the optical information recording medium. More specifically, the present invention relates to an optical information recording medium capable of performing efficient writing operation by laser beams, in particular, by semiconductor laser beams, and dithiolate transition metal complex compounds which are effective as a near-infrared-light absorption agent and a light stabilizer for use in the optical information recording medium.

2. Discussion of Background

In the field of information recording and reproducing, an information recording and reproducing apparatus capable of recording and reproducing information by applying a laser beam to a rotating disc-type information recording medium is conventionally known. For the above-mentioned information recording and reproducing apparatus, there are proposed, for example, information recording media which comprise a substrate and a recording layer formed thereon, comprising a low-melting metal, or a mixture of a low-melting metal and a dielectric material. However, the above information recording media have the shortcomings of poor preservability, insufficient resolution, low recording density and high manufacturing cost.

An information recording medium has been proposed, which is so constructed that an organic dye-containing thin-film comprising as the main component a polymethine dye, serving as a recording layer, is overlaid on a substrate. This information recording medium has an improved writing sensitivity and reflectance. Accordingly, it has an improved C/N ratio in reading operation. The above recording medium, however, has the shortcomings of poor stability to light and heat, unsatisfactory preservability and remarkable deterioration of the recording reproduction capability during repeated use.

In order to prevent the deterioration of the recording reproduction capability in the information recording medium, it is proposed that a nickel complex compound be added to the above-mentioned polymethine dye in the composition of the recording layer. However, the recording medium which comprises a recording layer comprising the polymethine dye and the above-mentioned conventional nickel complex compound is still unsatisfactory for use in practice because of high pit-error ratio and insufficient retention of signals for the reproduction of recorded information in the course of repeated actual operation.

With the progress of the development of the apparatus such as an optical recording medium, an infrared filter, a liquid-crystal display, a laser printer and various apparatus in the field of electrophotography, as previously mentioned, a demand for a dye-containing composition with high stability to light, capable of absorbing the light in a region from an infrared region over a near infrared region with high efficiency is recently increasing.

Conventionally, as a dye for the above-mentioned dye-containing composition capable of absorbing the light in the near infrared region, squarium-type dyes, cyanine-type dyes, metal phthalocyanines, platinum bis(dithio-α-diketone) complex compounds, and nickel complex compounds are known. However, these conventional dyes have their own shortcomings. For example, the squarium-type dyes have the shortcomings that the light absorbing intensity is poor, and they cannot be worked into a film; and the cyanine-type dyes have the shortcomings that they become chemically unstable when their molecular chains are elongated to improve the near infrared light absorbing capability. Furthermore, the metal phthalocyanine dyes show such a poor solubility in organic solvents that they cannot be worked into a thin film by the solution coating method. In addition, an amorphous film of the metal phthalocyanine dyes is easily crystallized, so that its application to the optical information recording medium is considerably restricted. The platinum bis(dithio-α-diketone) complex compounds have the shortcomings that their film-forming properties are poor and chemically unstable.

As for the conventional nickel complex compounds, benzenethiolate-type nickel complex compounds and dithiolene-type nickel complex compounds are in particular well-known. They cannot satisfy all the requirements such as solubility in solvents, compatibility with resins, film-forming properties and chemical stability.

Among the nickel complex compounds, dithiolate nickel complex compounds have a distinct property of deactivating oxygen in a singlet state, so that some attention is paid to the dithiolate nickel complex compounds as a practical light stabilizer and antioxidant for polyolefins, and as a photo-deterioration preventing agent for the organic dyestuff. However, the solubility in solvents, compatibility with resins and film-forming properties of these dithiolate nickel complex compounds are insufficient for use in practice.

SUMMARY OF THE INVENTION

It is therefore a first object of the present invention to provide an optical information recording medium which comprises a substrate and a recording layer comprising a polymethine dye, which medium has an improved resistance to light and heat, and excellent preservability for the repeated information reproduction operation.

A second object of the present invention is to provide a dye-containing composition for the optical information recording medium, which dye-containing composition (i) effectively functions as a near infrared absorbing agent and a light stabilizer in a recording layer of the recording medium, (ii) is chemically stable, and (iii) has high solubility in organic solvents and high compatibility with resins, and excellent film-forming properties.

A third object of the present invention is to provide novel nickel complex compounds for use in the optical information recording medium.

The first object of the present invention can be achieved by an optical information recording medium which comprises a substrate and an organic thin-film recording layer formed thereon, which recording layer comprises at least a polymethine dye and a compound having the following formula (I):

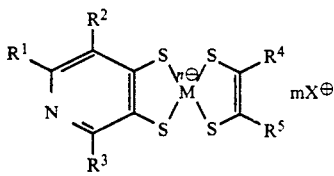

wherein R[1], R[2] and R3 each independently represent hydrogen, a halogen atom, an alkyl group having 1 to 6 carbon atoms, a perfluoroalkyl group having 1 to 6 carbon atoms; R[4] and R[5] each independently represent hydrogen, an alkyl group having 1 to 6 carbon atoms, an aryl group or a cyano group, which may form a heterocyclic ring; X represents a cation; M represents a transition metal; n is an integer of 0 to 2, which represents the valence number of the transition metal; and m represents the number of cations, which is an integer of 0 to 2, corresponding to the valence number of the transition metal.

The second object of the present invention can be achieved by a dye-containing composition for use in the optical information recording medium, which dye-containing composition comprises at least one polymethine dye and a compound having the above-mentioned formula (I).

The third object of the present invention can be achieved by dithiolate nickel complex compounds having formula (II).

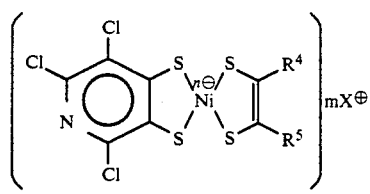

wherein R[4] and R[5] are the same as previously defined in formula (I); X represents a cation such as cations of quaternary ammonium salts, cations of quaternary phosphonium salts and a sodium cation; m and n are respectively the same as defined in formula (I).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
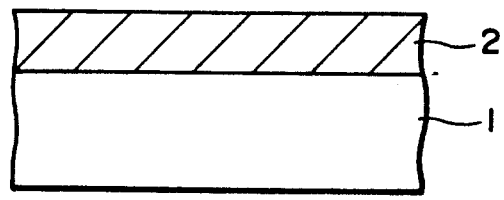
FIG. 1 is a cross-sectional view of a first embodiment of the optical information recording medium according to the present invention.

In an optical information recording medium according to the present invention, a recording layer which is formed on a substrate comprises a dye-containing composition which comprises a polymethine dye and a compound having formula (I).

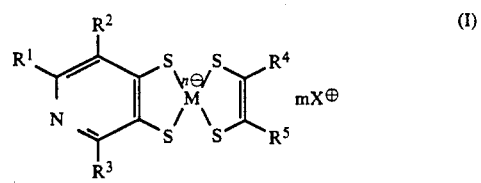

wherein R[1], R[2] and R[3] each independently represent hydrogen, a halogen atom, an alkyl group having 1 to 6 carbon atoms or a perfluoroalkyl group having 1 to 6 carbon atoms; R[4] and R[5] each independently represent hydrogen, an alkyl group having 1 to 6 carbon atoms, an aryl group or a cyano group, which may form a heterocyclic ring; X represents a cation; M represents a transition metal; n is an integer of 0 to 2, which represents the valence number of the transition metal; and m represents the number of cations, which is an integer of 0 to 2, corresponding to the valence number of the transition metal.

Examples of cations represented by X⊕ in the formula (I) are cations of quaternary ammonium salts, quaternary phosphonium salts and sodium. Examples of transition metals represented by M in formula (I) are nickel, palladium and platinum.

The above-mentioned dithiolate nickel complexes represented by formula (I) for use in the optical information recording medium according to the present invention can be generally obtained as follows:

A 3,4-dimercaptopyridine derivative is synthesized from a 3,4-dihalopyridine derivative by the same method as employed in the preparation of dithiol which is disclosed in Japanese Laid-Open Patent Application 58-105960. The above-mentioned 3,4-dimercaptopyridine derivative is then allowed to react with nickel chloride (NiCl$_2$), whereby the corresponding dithiolate nickel complex can be obtained.

Examples of 3,4-dihalopyridine derivatives used for the preparation of 3,4-dimercaptopyridine derivatives are as follows:

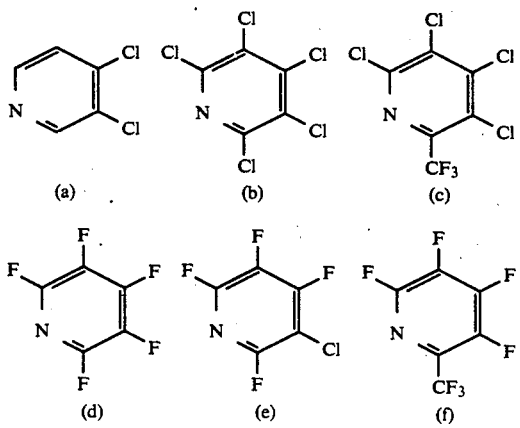

The thus obtained nickel complexes of formula (I) may be nickel complexes having a zero valence, and in the presence of a cation such as a tetraalkylammonium salt and a tetraalkylphosphonium salt, monovalent or divalent nickel complexes can be obtained. In such a case, the valence number of the obtained nickel complexes can be controlled by means of a reducing agent such as $NaBH_4$ and an oxidizing agent such as iodine.

In addition, to make the dithiolate nickel complex unsymmetrical in the structure, a mixture of the above-mentioned zero-valent nickel complex which has a pyridine skeleton and a conventional divalent nickel complex may be refluxed in an organic solvent under application of heat for exchanging ligands as shown below. Thus, unsymmetrical monovalent nickel complexes can be obtained.

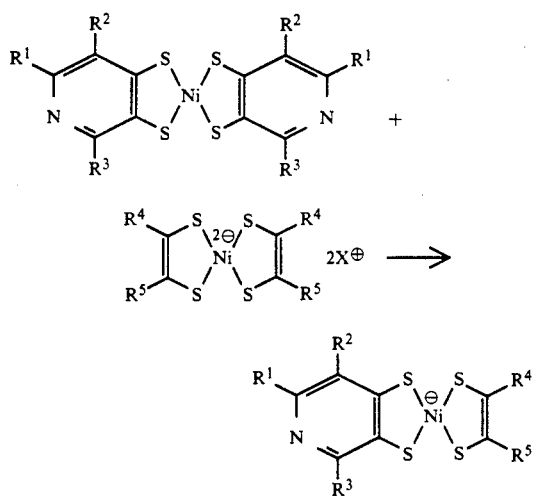

Examples of the conventional dithiolate nickel complexes are shown as follows, but not limited thereto in the present invention.

Type (1): Dithiolate Nickel Complexes No. 1 to No. 11 having formula (I-1).

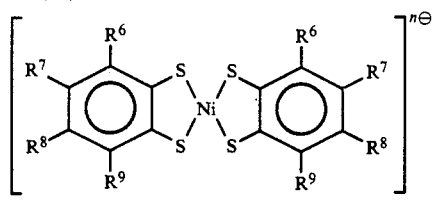
(I-1)

wherein $R^6$, $R^7$, $R^8$ and $R^9$ each independently represent hydrogen, an alkyl group which may have a substituent, an amino group which may have a substituent, or a halogen atom; and n is an integer of 0 to 2.

TABLE 1

| Complex No. | $R^6$ | $R^7$ | $R^8$ | $R^9$ |
|---|---|---|---|---|
| 1 | Cl | Cl | H | Cl |
| 2 | Cl | Cl | Cl | Cl |
| 3 | H | $N(CH_3)_2$ | $CH_3$ | H |
| 4 | H | H | H | H |
| 5 | H | $CF_3$ | H | H |
| 6 | Cl | H | H | Cl |
| 7 | H | $CH_3$ | H | H |
| 8 | H | tert-$C_4H_9$ | H | H |
| 9 | $CH_3$ | $CH_3$ | $CH_3$ | $CH_3$ |
| 10 | H | $N(CH_3)_2$ | H | H |

TABLE 1-continued

| Complex No. | $R^6$ | $R^7$ | $R^8$ | $R^9$ |
|---|---|---|---|---|
| 11 | H | $CH_2OH$ | H | H |

Type (2): Diothialate Nickel Complexes No. 12 to No. 17 having formula (I-2).

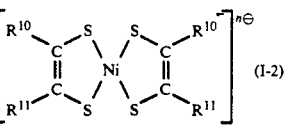
(I-2)

wherein $R^{10}$ and $R^{11}$ each represent an alkyl group which may have a substituent, an aryl group which may have a substituent, or a cyano group; and n is an integer of 0 to 2.

TABLE 2

| Complex No. | $R^{10}$ | $R^{11}$ |
|---|---|---|
| 12 | –Ph | –Ph |
| 13 | –C6H4–N(CH3)2 | –Ph |
| 14 | –C6H4–N(C2H5)2 | –C6H4–N(C2H5)2 |
| 15 | —CN | —CN |
| 16 | —$CH_3$ | —$CH_3$ |
| 17 | —$C_2H_5$ | —$C_2H_5$ |

Type (3): Dithiolate Nickel Complexes No. 18 to No. 20 having formula (I-3).

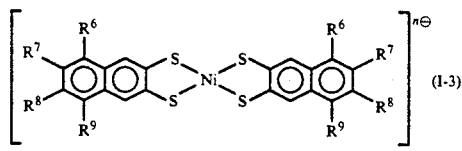
(I-3)

wherein $R^6$, $R^7$, $R^8$, $R^9$ and n are the same as previously defined.

TABLE 3

| Complex No. | $R^6$ | $R^7$ | $R^8$ | $R^9$ |
|---|---|---|---|---|
| 18 | H | H | H | H |
| 19 | H | Cl | Cl | H |
| 20 | H | Br | H | H |

Type (4): Dithiolate Nickel Complex No. 21 having formula (I-4).

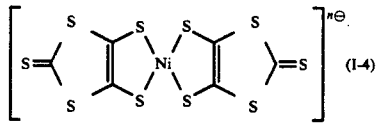
(I-4)

In the case where the obtained nickel complex is not divalent, it is possible to change the above nickel complex into a divalent complex by reduction. More specifically, a dithiolate nickel complex which is not divalent is dissolved or dispersed in an organic solvent such as methanol. To this solution or dispersion, a 60% aqueous solution of sodium hydroxide is added to make the solution or dispersion basic, and $NaBH_4$ is further added thereto. The mixture is then reduced at about 40° C., whereby the above nickel complex is changed into a divalent complex.

In formula (I), M is not only Ni, but also other transition metals, such as palladium and platinum. These metal complexes can be obtained in the same manner as employed in the preparation of nickel complexes.

Among the compounds represented by formula (I), the following dithiolate nickel complex compounds having formula (VI) are novel and preferable for the dye-containing composition for use in the optical information recording medium.

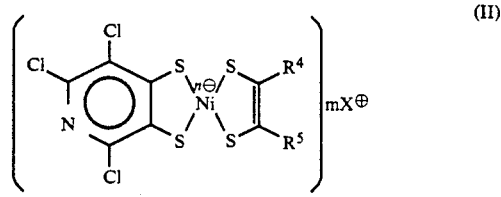

wherein $R^4$ and $R^5$ are the same as previously defined in formula (I); X represents a cation such as cations of quaternary ammonium salts, cations of quaternary phosphonium salts and a sodium cation; m and n are respectively the same as defined in formula (I).

The above novel dithiolate nickel complex compounds of formula (II) show a particular absorption intensity in the near infrared region. Furthermore, they can form a hydrogen bonding because of the presence of a pyridine skeleton therein, which imparts to the above dithiolate nickel complex compounds good properties such as excellent solubility in a polar solvent such as alcohol, excellent compatibility with resins, and high stability. Therefore the above-mentioned dithiolate nickel complex compounds according to the present invention are expected to be applied to the various fields. For instance, the dithiolate nickel complex compounds can be used in a safelight filter for photoconductive materials; a filter which is a barrier to the infrared rays harmful to the eyes; a plastic film for controlling the growth of plants; a plastic film for intercepting heat rays; an infrared rays cut-off filter for semiconductor receptor elements such as a silicon photodiode; a quencher of oxygen in a singlet state; a fading preventing agent; a light-resistance improving agent for a dye contained in an optical disc; a dye for the recording operation employed in an optical disc; a material capable of converting laser beam into heat; an ink composition for an ink-jet type printer; an ink composition for a bar coder; an infrared coupler which forms an infrared absorptive dye for a sound track; a filter for an optical converting element; a thermal label for industrial use; and a solid ink composition contained in an ink ribbon for thermal image transfer recording.

The nickel complex compounds according to the present invention having formula (II) has at least one legand of the following skeleton of formula (III):

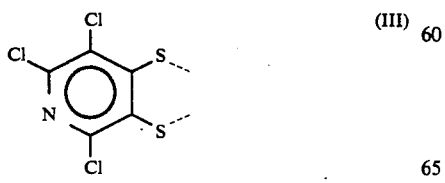

In the case where the nickel complex of formula (II) according to the present invention is unsymmetrical, other conventional legands may be employed. It is preferable that the nickel complex according to the present invention of formula (II) be monovalent. This is because the monovalent nickel complex can exhibit not only excellent solubility in a solvent but also a great absorption intensity in the near infared region. To prepare such a monovalent nickel complex, a quaternary ammonium salt and a quaternary phosphonium salt are used as a cation source.

Examples of the nickel complex compounds of formula (III) according to the present invention include not only the following zero-valent nickel complex compounds, but also the nickel complex compounds which can be obtained by combining the above zero-valent nickel complex compounds and the cations to be described later.

(1) Examples of zero-valent nickel complexes according to the present invention:

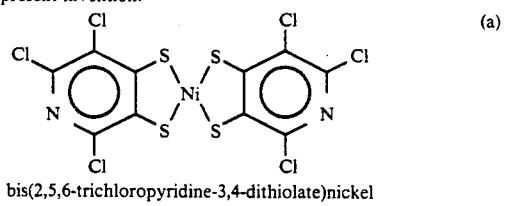

bis(2,5,6-trichloropyridine-3,4-dithiolate)nickel

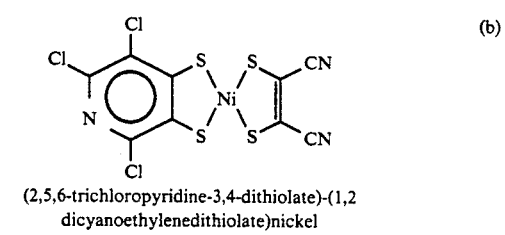

(2,5,6-trichloropyridine-3,4-dithiolate)-(1,2 dicyanoethylenedithiolate)nickel

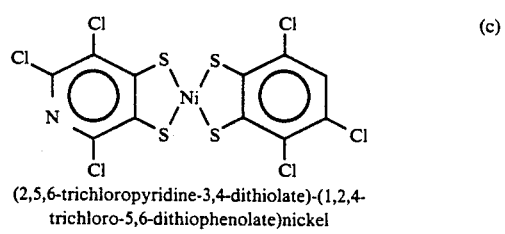

(2,5,6-trichloropyridine-3,4-dithiolate)-(1,2,4-trichloro-5,6-dithiophenolate)nickel

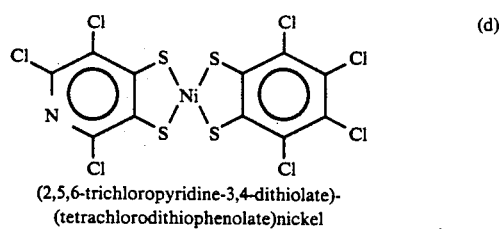

(2,5,6-trichloropyridine-3,4-dithiolate)-(tetrachlorodithiophenolate)nickel

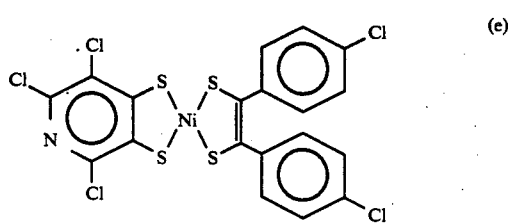

(2,5,6-trichloropyridine-3,4-dithiolate)-[bis(4-chlorophenyl)ethylene-1,2-dithiolate]nickel -continued

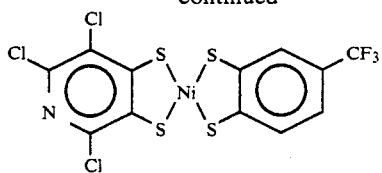

(2,5,6-trichloropyridine-3,4-dithiolate)-(4-trifluoromethyl-1,2-dithiophenolate)nickel

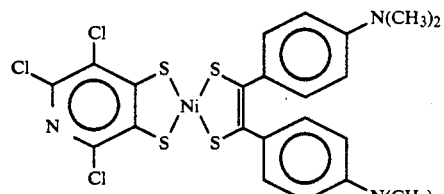

(2,5,6-trichloropyridine-3,4-dithiolate)-[bis(4-dimethylaminophenyl)ethylene-1,2-dithiolate]nickel

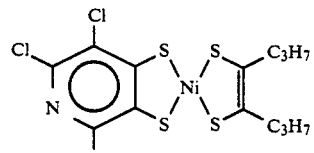

(2,5,6-trichloropyridine-3,4-dithiolate)-(4-octene-4,5-dithiolate)nickel

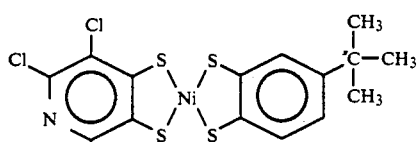

(2,5,6-trichloropyridine-3,4-dithiolate)-(4-tert-butyl-1,2-dithiophenolate)nickel (2) Examples of cations:

$N^{\oplus}(C_2H_5)_4$ (i)
(Tetraethylammonium cation)

$N^{\oplus}(n\text{-}C_4H_9)_4$ (ii)
(Tetra-n-butylammonium cation)

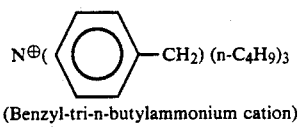 (iii)

(Benzyl-tri-n-butylammonium cation)

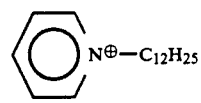 (iv)

(N-laurylpyridinium cation)

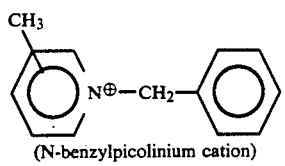 (v)

(N-benzylpicolinium cation)

$N^{\oplus}(CH_3)_3(C_{16}H_{33})$ (vi)
(Trimethyl-hexadecaneammonium cation)

$P^{\oplus}(n\text{-}C_4H_9)_4$ (vii)
(Tetra-n-butylphosphonium cation)

$P^{\oplus}(C_2H_5)(C_6H_{13})_3$ (viii)

-continued
(Trihexylethylphosphonium cation)

$P^{\oplus}(C_8H_{17})_4$ (ix)
(Tetraoctylphosphonium cation)

$P^{\oplus}(C_2H_5)_4$ (x)
(Tetraethylphosphonium cation)

The above-mentioned nickel complex of formula (II) according to the present invention can be obtained as follows:

2,5,6-trichloropyridine-3,4-dithiol is synthesized from pentachloropyridine by the same method as employed in the preparation of dithiol which is disclosed in Japanese Laid-Open Patent Application 58-105960. The above-mentioned 2,5,6-trichloropyridine-3,4-dithiol is allowed to react with nickel chloride (NiCl$_2$), whereby a symmetrical nickel complex having a zero valence is obtained. When the above-mentioned reaction is carried out in the presence of a cation, a monovalent nickel complex is obtained. A reducing agent such as NaBH$_4$ may be employed in the course of the reaction, when necessary. Alternatively, the above-mentioned zero-valent nickel complex and a divalent nickel complex may be refluxed in a solvent such as 1,2-dichloroethane under application of heat for exchanging legands with each other. Thus, an unsymmetrical monovalent nickel complex according to the present invention can be obtained.

The optical information recording medium according to the present invention is basically composed of a substrate and a recording layer. Furthermore, an intermediate layer such as an undercoat layer may be interposed between the substrate and the recording layer, or a protective layer may be formed on the recording layer. Alternatively, an air-sandwich type recording medium and a sealed-type recording medium, which will be described later in detail, can be prepared.

When the compound having formula (I) is contained together with a polymethine dye in the recording layer of the optical information recording medium according to the present invention, the recording medium exhibits an improved resistance to light and heat, and effectively prevents the deterioration of the recording and reproduction capability. To enhance the above advantages, the compound of formula (I) may also be contained in the above-mentioned undercoat layer or protective layer, or in both of them. In this case, it is preferable that the mixing ratio of the amount of the compound of formula (I) to the total solid components in the undercoat layer or protective layer be in the range of 2 to 100 wt.%, more preferably in the range of 20 to 100 wt.%. If contained in both of the undercoat layer and the protective layer, the compound of formula [I] can be added to the composition of the respective layers at the above defined mixing ratio.

The preferable properties of the materials for use in the optical information recording medium according to the present invention, and the each layer will now be explained.

(1) Substrate

When a laser beam is applied to the substrate to perform recording and reproducing operation, the substrate of the optical information recording medium is required to be transparent. However, when the laser beam is applied to the recording layer for recording and reproducing operation, it is not required that the substrate be transparent.

Examples of the materials for use in the substrate are plastic materials such as polyester, acrylic resin, polyamide, polyolefin resin, phenolic resin, epoxy resin and polyimide; glass; ceramic; and finely-divided metal particles.

Preformats for address signals and pregrooves may be formed on the surface of the substrate. The substrate for use in the present invention can be manufactured by the conventional photo polymerization method or injection method.

(2) Recording Layer

Information is recorded in the recording layer by causing some optical changes in the layer by exposing the recording layer to laser beams. The recording layer comprises as the main components a polymethine dye and a compound having formula (I).

Examples of the polymethine dye for use in the present invention are cyanine dyes, merocyanine dyes, and pyrylium dyes.

To improve the recording characteristics and stability, the above-mentioned polymethine dyes can be used in combination. Alternatively, a mixture of the polymethine dye and other dyes such as phthalocyanine dyes, dioxazine dyes, triphenothiazine dyes, phenanthrene dyes, anthraquinone dyes (indanthrene dyes), xanthene dyes, triphenylmethane dyes and azulene dyes; metals such as In, Sn, Te, Bi, Al, Se, Ag and Cu; and metallic compounds such as $TeO_2$ and SnO may be dispersed in the recording layer. The above dyes, metals and metallic compounds may be laminated in the form of a layer on the recording layer comprising the polymethine dye and the compound of formula (I).

The recording layer may further contain a high polymeric substance, a storage stabilizing agent such as metal complexes and phenolic compounds, a dispersant, a flame retardant, a lubricant, an antistatic agent and a plasticizer.

It is preferable that the mixing ratio by weight of the polymethine dye to the compound having the formula (I) in the recording layer be in the range of (50 : 50) to (98 : 2), more preferably in the range of (70 : 30) to (95 : 5).

The recording layer can be formed on the substrate by the conventional methods, such as deposition, sputtering, CVD (chemical vapor deposition) and solution coating. Among the above methods, the solution coating method is preferable. When the solution coating method is employed, the polymethine dye is dissolved in an organic solvent such as alcohols, ketones, amides, ethers, sulfoxides, esters, aliphatic halogenated hydrocarbons or aromatic materials, and then the thus obtained solution is coated on the substrate by the conventional methods such as spray coating, spinner coating, dip coating, blade coating and roller coating. It is preferable that the thickness of the recording layer for use in the present invention be in the range of 100 Å to 10 $\mu$m, more preferably in the range of 200 Å to 2 $\mu$m.

(3) Undercoat Layer

The undercoat layer is formed for the purposes of (a) improving the adhesion strength between the substrate and the recording layer, (b) preventing the recording layer from being exposed to water and gases, (c) improving the preservability of the recording layer, (d) increasing the reflectance to the laser beam, (e) protecting the substrate from the solvent employed and (f) forming the pregroove.

To attain the above-mentioned purpose (a), high polymeric materials such as ionomer resin, polyamide resin, vinyl resin, natural polymer, silicone and liquid-type rubber; and a silane coupling agent may be used.

To attain the purposes (b) and (c), inorganic compounds such as $SiO_2$, $MgF_2$, SiO, $TiO_2$, ZnO, TiN and SiN; and metals or metalloides such as Zn, Cu, S, Ni, Cr, Ge, Se, Au, Ag and Al can be contained in addition to the above-mentioned high polymeric materials in this undercoat layer.

To attain the purpose (d), metals such as Ag and Al; and dyes having a metallic luster, such as methine dyes and xanthene dyes may be contained in the undercoat layer.

To attain the purposes (e) and (f), an ultraviolet-curing resin, a thermosetting resin and a thermoplastic resin may be used in the undercoat layer.

It is preferable that the thickness of the undercoat layer be in the range of 0.1 $\mu$m to 30 $\mu$m, more preferably in the range of 0.2 $\mu$m to 10 $\mu$m.

(4) Protective Layer

The protective layer is formed on the recording layer to protect the recording layer from being scratched, and prevent the dust and stain from directly adhering to the recording layer. In addition, the protective layer is also provided to improve the preservability and reflectance of the recording layer.

The same materials as used in the undercoat layer can be employed in the protective layer.

It is preferable that the thickness of the protective layer be in the range of about 0.05 $\mu$m to about 5 $\mu$m.

In the undercoat layer and the protective layer, a stabilizer, a dispersant, a flame-retardant, a lubricant, an antistatic agent, a surface-active agent and a plasticizer may be contained.

The structure of the optical information recording medium according to the present invention will now be explained in detail by referring to FIGS. 1 through 4.

As shown in FIG. 1, an optical information recording medium according to the present invention is basically so costructed that a recording layer 2 comprising a polymethine dye and a compound having formula (I) is overlaid on a substrate 1. In this structure, a two-layered type recording layer may be employed. For example, a light reflection layer and a light absorption layer may constitute the recording layer. The laminating order is not specifically limited in this case.

Figure 2:
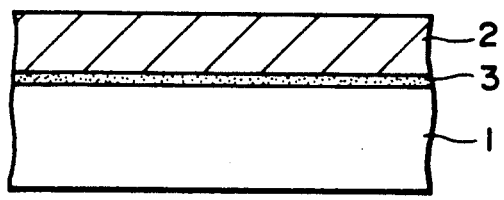
FIG. 2 is a cross-sectional view of a second embodiment of the optical information recording medium according to the present invention.

In FIG. 2, an undercoat layer 3 is interposed between the substrate 1 and the recording layer 2.

Figure 3:
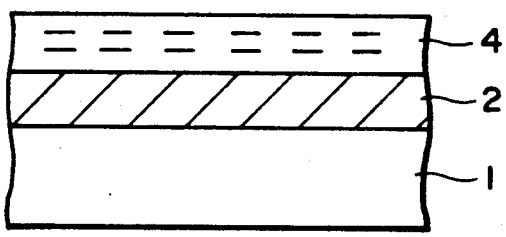
FIG. 3 is a cross-sectional view of a third embodiment of the optical information recording medium according to the present invention.

In FIG. 3, a recording layer 2 and a protective layer 4 are overlaid on a substrate 1 successively, in this order.

Figure 4:
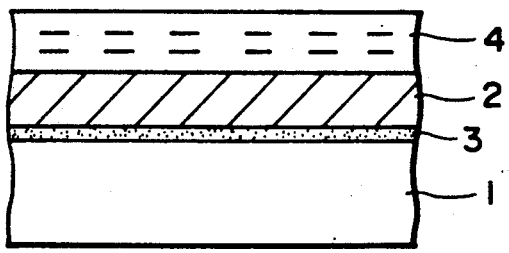
FIG. 4 is a cross-sectional view of a fourth embodiment of the optical information recording medium according to the present invention.

In FIG. 4, an undercoat layer 3 is interposed between a substrate 1 and a recording layer 2, and a protective layer 4 is further formed on the recording layer 2.

Furthermore, an optical information recording medium with an air-sandwich structure can be obtained by disposing a pair of optical information recording media selected from the embodiments as shown in FIGS. 1 to 4 in a concentric configuration. Two substrates are sealed via an air space interposed therebetween, with the respective recording layers 2 turned inside. Either of the recording media may have only a substrate. Alternatively, one optical information recording medium selected from the embodiments as shown in FIGS. 1 to 4 may be sealed with the other recording medium with the same structure as the above, with a protective layer 4 interposed therebetween and the respective recording layers 2 turned inside, to form an optical information recording medium with a sealed-type structure.

Semiconducter laser beams having a wavelength of 750 to 850 nm, serving as a light source for recording and reproducing information, can minimize the size of an optical information recording apparatus.

Other features of this invention will become apparent in the course of the following description of exemplary embodiments, which are given for illustration of the invention and are not intended to be limiting thereof.

SYNTHESIS EXAMPLE 1

Preparation of dithiolate nickel complex No. 1 according to the present invention
{bis(2,5,6-trichloropyridine-3,4-dithiolate)nickel complex}

A mixture of 20 parts by weight of pentachloropyridine, 16 parts by weight of sodium hydrogensulfide (NaHS) with a purity of 70%, 3.4 parts by weight of iron powder, 1.6 parts by weight of sulfur powder and 70 parts by weight of N,N-dimethylformamide was heated with stirring in a reactor at 130° C. for 10 hours, with a stream of nitrogen gas slowly passed therethrough. The reaction mixture was cooled, and 200 parts by weight of water was added to this reaction mixture. The resulting black solid material was filtered off from the reaction mixture. This black solid was air-dried and then mixed with an aqueous solution consisting of 100 parts by weight of methanol, 8 parts by weight of zinc oxide, 20 parts by weight of sodium hydroxide and 100 parts by weight of water. This reaction mixture was refluxed under application of heat for 1 hour. After the mixture was cooled, it was filtered. The obtained filtrate was poured into an acid solution consisting of 200 parts by weight of water and 100 parts by weight of a 98% sulfuric acid, so that a brown solid material was obtained. The thus obtained brown solid material was extracted from chloroform. The extract was washed with water several times and the chloroform was removed therefrom by evaporating the chloroform to dryness, whereby 10 parts by weight of 2,5,6-trichloropyridine-3,4-dithiol was obtained in the form of a yellow solid. The melting point was 132 to 133.5° C.

Figure 5:
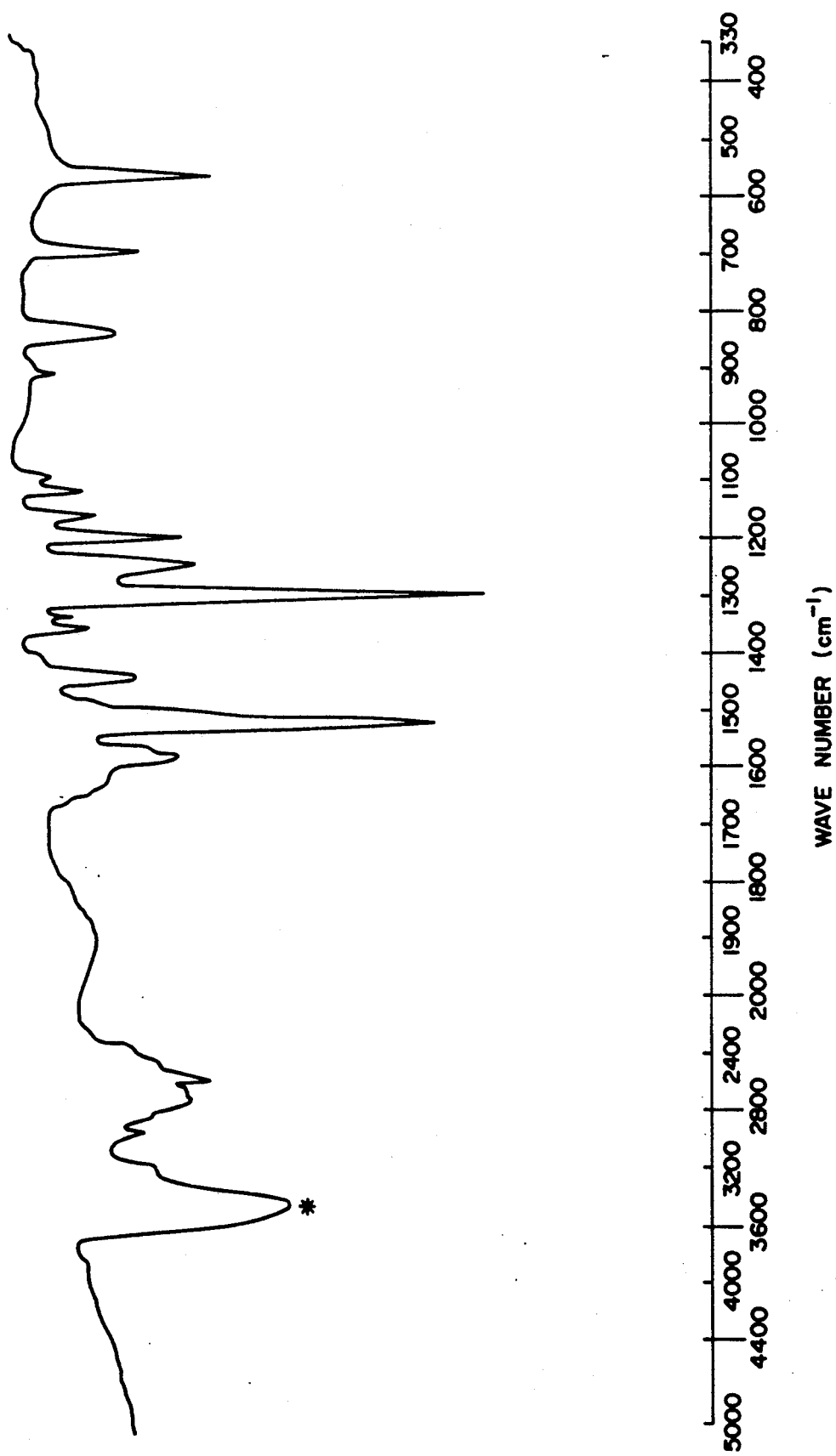
FIGS. 5 to 8 are IR spectra of nickel complexes according to the present invention.

10 parts by weight of the thus obtained 2,5,6-trichloropyridine-3,4-dithiol was dissolved in 350 parts by weight of chloroform. To this solution, a solution consisting of 4.8 parts by weight of NiCl$_3$·6H$_2$O and 100 parts by weight of ethanol was added, so that 12 parts by weight of a red zero-valent nickel complex, bis(2,5,6-trichloropyridine-3,4-dithiolate)nickel complex was obtained. The melting point was 300° C. or more. An infrared spectrum of the thus obtained nickel complex, taken by use of a KBr tablet, is shown in FIG. 5. In FIG. 5, the mark (*) indicates a peak showing the presence of water in the KBr tablet. The thus obtained nickel complex is represented by the following formula:

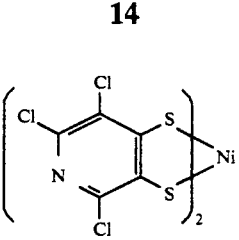

SYNTHESIS EXAMPLE 2

Preparation of dithiolate nickel complex No. 2 according to the present invention
{bis(2,5,6-trichloropyridine-3,4-dithiolate)nickel tetra-n-butylammonium}

A mixture of 12 parts by weight of bis(2,5,6-trichloropyridine-3,4-dithiolate)nickel complex having zero-valence obtained in Synthesis Example 1 and 10 parts by weight of tetra-n-butylammonium bromide was dissolved in 200 parts by weight of 1,2-dichloroethane. This solution was refluxed under application of heat for 5 hours. The mixture was then cooled and filtered. The thus obtained filtrate was evaporated to dryness, so that a green crude product was obtained. The thus obtained crude product was subjected to column chromatography, using a silicagel (Trademark "Wakogel C-200" made by Wako Pure Chemical Industries, Ltd.) and chloroform as a developing solvent, whereby 5 parts by weight of bis(2,5,6-trichloropyridine-3,4-dithiolate)-nickel tetra-n-butylammonium according to the present invention was obtained. The melting point was 197–199° C.

Figure 6:
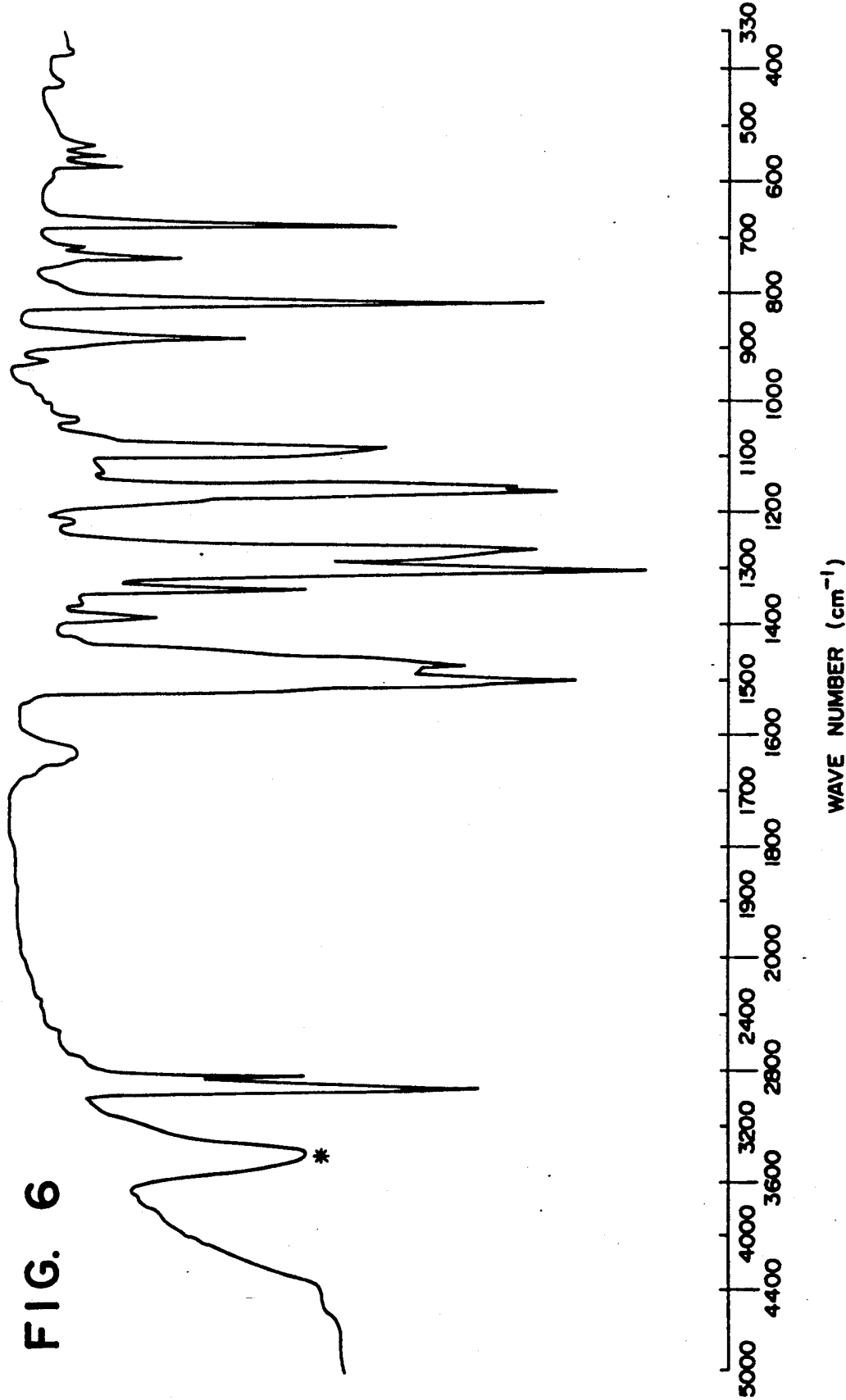

An infrared spectrum of the thus obtained nickel complex, taken by use of a KBr tablet, as shown in FIG. 6, indicated a maximum absorption at 843 nm in a solvent of methanol. The molar absorption coefficient was 8900. In FIG. 6, the mark (*) indicates a peak showing the presence of water in the KBr tablet. The thus obtained nickel complex is represented by the following formula:

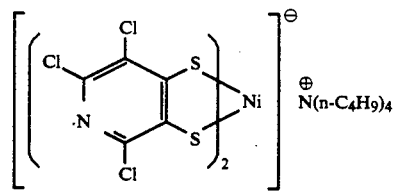

SYNTHESIS EXAMPLE 3

Preparation of dithiolate nickel complex No. 3 according to the present invention A mixture of 10 parts by weight of bis(2,5,6-trichloropyridine-3,4-dithiolate)nickel complex having a zero-valence obtained in Synthesis Example 1 and 15 parts by weight of a divalent nickel complex having the following formula was refluxed under application of heat in 520 parts by weight of 1,2-dichloroethane for 5 hours:

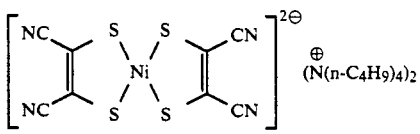

The mixture was then cooled and filtered. The thus obtained filtrate was evaporated to dryness, so that a crude product was obtained. The thus obtained crude product was subjected to column chromatography, using a mixed solvent of chloroform and 1,2-dichloroethane, serving as a developing solvent, whereby 5 parts by weight of dithiolate nickel complex compound No. 3 according to the present invention was obtained. The melting point was 127.5–128° C.

Figure 7:
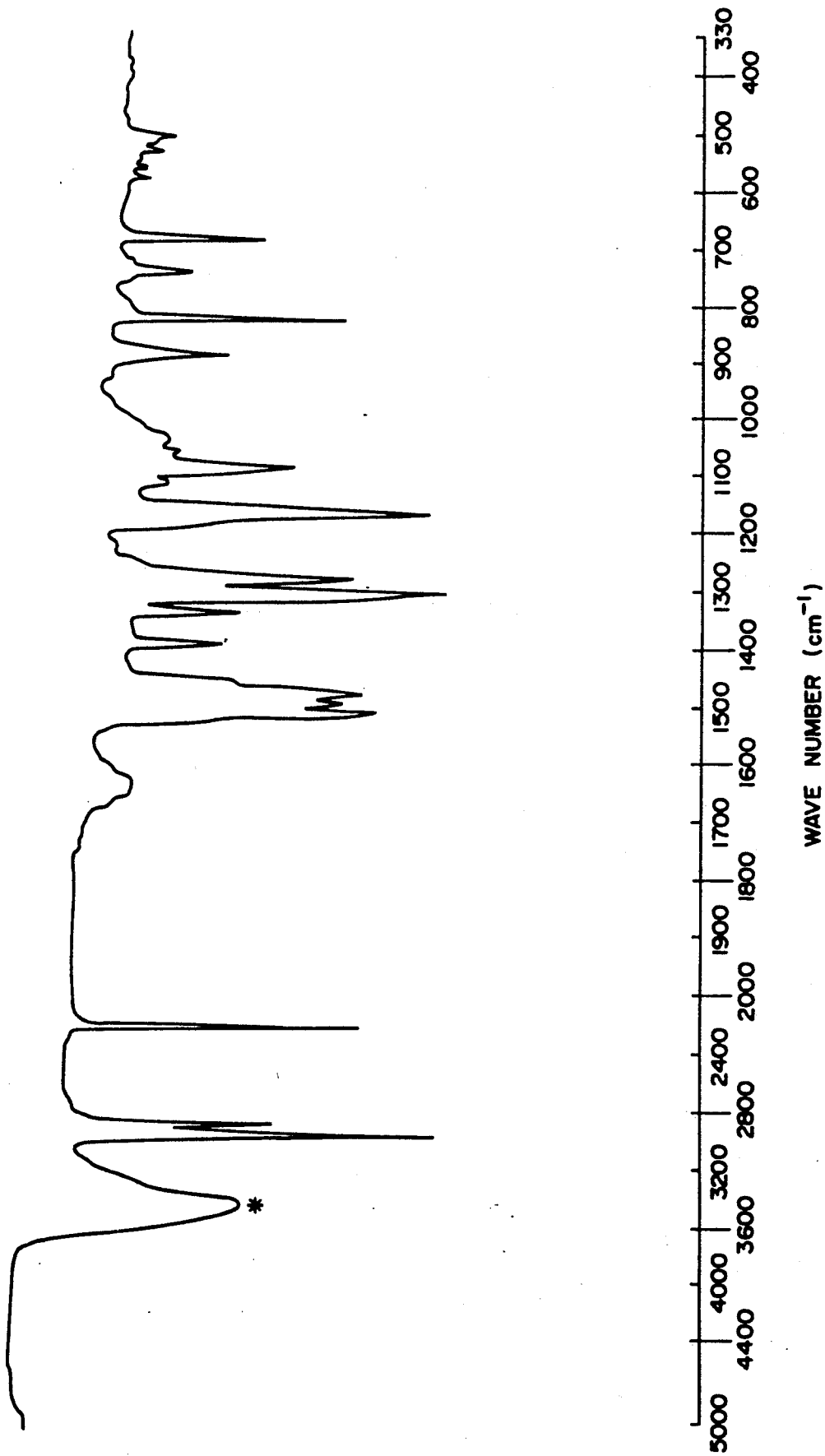

An infrared spectrum of the thus obtained nickel complex, taken by use of a KBr tablet, as shown in FIG. 7, indicated a maximum absorption at 850 nm in a solvent of methanol. The molar absorption coefficient was 9600. In FIG. 7, the mark (*) indicates a peak showing the presence of water in the KBr tablet. The thus obtained nickel complex is represented by the following formula:

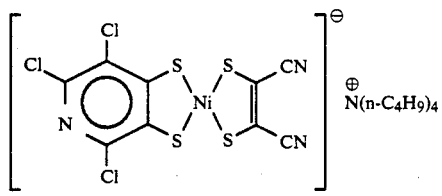

SYNTHESIS EXAMPLE 4

Preparation of dithiolate nickel complex No. 4 according to the present invention 31 parts by weight of a commercially available bis(3,5,6-trichlorobenzene-1,2-dithiolate)nickel tetra-n-butylammonium complex (Trademark "PA1006" made by Mitsui Toatsu Fine Chemicals Inc.) was dispersed in 270 parts by weight of ethanol. To this dispersion, 12 parts by weight of a 50% aqueous solution of sodium hydroxide was added and 1.5 parts by weight of NaBH$_4$ was further added. This reaction mixture was stirred at about 40° C. for 2 hours. As a result, the reaction mixture was turned into a red transparent solution.

To the thus obtained red transparent solution, 25.4 parts by weight of tetra-n-butylammonium bromide was added. The mixture was stirred at room temperature for 2 hours. A precipitate in the above mixture was filtered off, washed with water and dried, whereby 36 parts by weight of a divalent bis(3,5,6-trichlorobenzene-1,2-dithiolate)-nickel tetra-n-butylammonium complex was obtained.

A mixture of 5.3 parts by weight of bis(2,5,6-trichloropyridine-3,4-dithiolate)nickel complex having zero-valence obtained in Synthesis Example 1 and 10 parts by weight of the above prepared divalent bis(3,5,6-trichlorobenzene-1,2-dithiolate)nickel tetra-n-butylammonium complex was refluxed under application of heat in 320 parts by weight of 1,2-dichloroethane for 5 hours.

The mixture was then cooled and filtered. The thus obtained filtrate was evaporated to dryness, so that a crude product was obtained. The thus obtained crude product was subjected to column chromatography, using a mixed solvent of chloroform and 1,2-dichloroethane, serving as a developing solvent, whereby 6.5 parts by weight of dithiolate nickel complex compound No. 4 according to the present invention was obtained. The melting point was 141–142.5° C.

Figure 8:
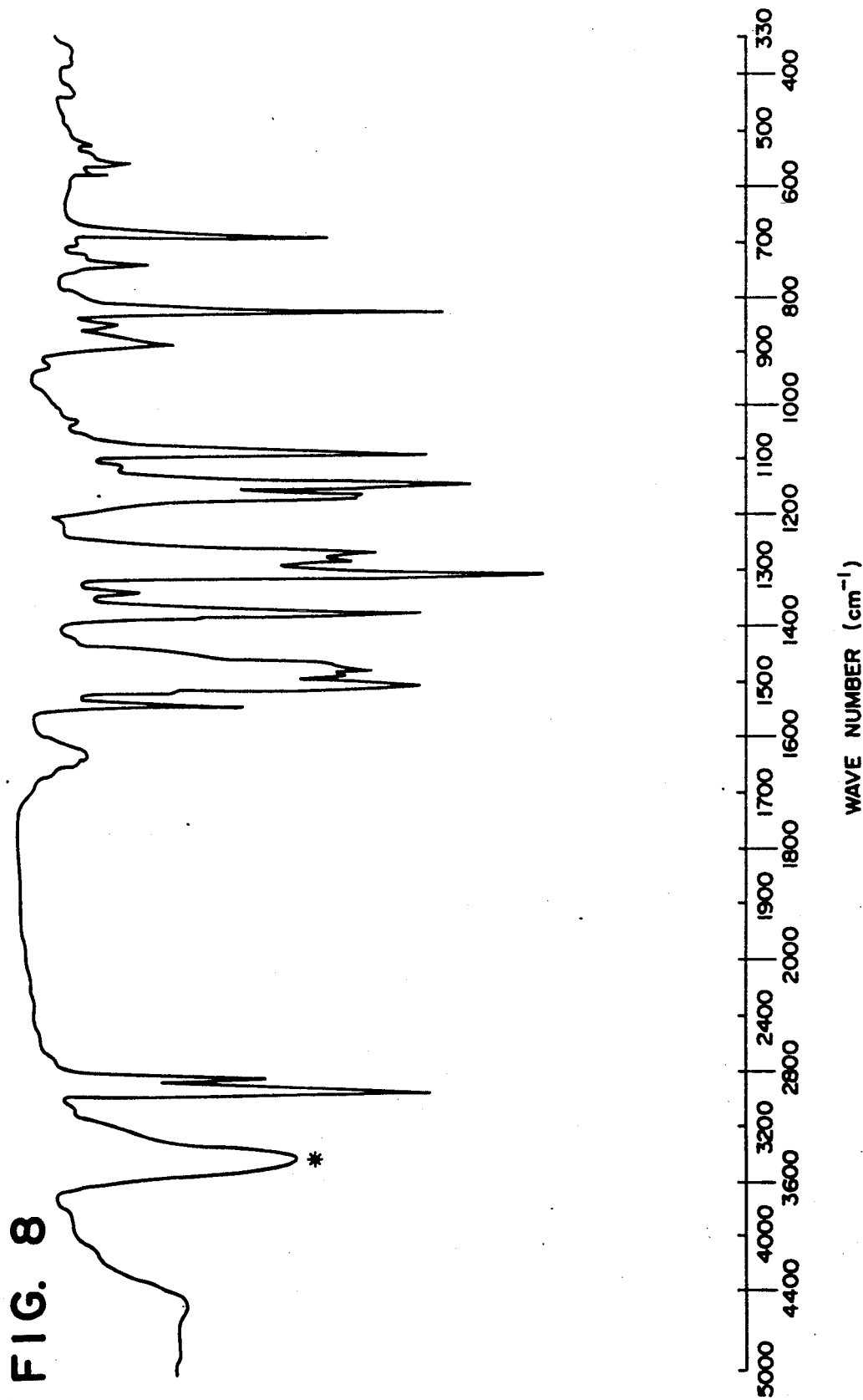

An infrared spectrum of the thus obtained nickel complex, taken by use of a KBr tablet, as shown in FIG. 8, indicates a maximum absorption at 860 nm in a solvent of methanol. The molar absorption coefficient was 12800. In FIG. 8, the mark (*) indicates a peak showing the presence of water in the KBr tablet. The thus obtained nickel complex is represented by the following formula:

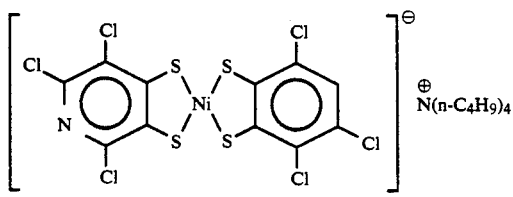

EXAMPLE 1

A polycarbonate substrate having a thickness of 1.25 mm and a diameter of 200 mm was prepared, which was provided with grooves having a depth of 950 Å and a half-value width of 0.3 μm, formed by injection molding at intervals of a track pitch of 1.6 μm in a 45–94 mm radius range of the substrate.

A mixture of a dye having the following formula and the dithiolate nickel complex No. 1 obtained in Synthesis Example 1 at a mixing ratio by weight of 85 to 15 was dissolved in a mixed solvent consisting of 80 parts by weight of methanol and 20 parts by weight of 1,2-dichlorobutane, so that a coating solution for a recording layer was prepared:

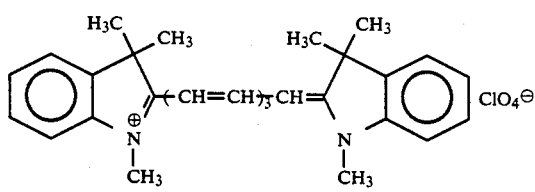

The thus prepared coating solution was coated on the above polycarbonate substrate by spin coating, whereby a recording layer having a thickness of 700 Å was formed on the substrate. Thus, an optical information recording medium No. 1 according to the present invention was obtained.

EXAMPLE 2

Example 1 was repeated except that dithiolate nickel complex No. 1 employed in the coating solution for the recording layer in Example 1 was replaced by dithiolate nickel complex No. 2 obtained in Synthesis Example 2, whereby an optical information recording medium No. 2 according to the present invention was obtained.

EXAMPLE 3

Example 1 was repeated except that dithiolate nickel complex No. 1 employed in the coating solution for the recording layer in Example 1 was replaced by dithiolate nickel complex No. 3 obtained in Synthesis Example 3, whereby an optical information recording medium No. 3 according to the present invention was obtained.

EXAMPLE 4

Example 1 was repeated except that dithiolate nickel complex No. 1 employed in the coating solution for the recording layer in Example 1 was replaced by dithiolate nickel complex No. 4 obtained in Synthesis Example 4, whereby an optical information recording medium No. 4 according to the present invention was obtained.

COMPARATIVE EXAMPLE 1

Example 1 was repeated except that dithiolate nickel complex No. 1 employed in the coating solution for the recording layer in Example 1 was replaced by a commercially available dithiolate nickel complex (Trademark "PA1006" made by Mitsui Toatsu Fine Chemicals Inc.), whereby a comparative optical information recording medium No. 1 was obtained.

COMPARATIVE EXAMPLE 2

Example 1 was repeated except that dithiolate nickel complex No. 1 was eliminated from the coating solution for the recording layer employed in Example 1, whereby a comparative optical information recording medium No. 2 was obtained.

EXAMPLE 5

A polymethyl methacrylate substrate having a thickness of 1.2 mm and a diameter of 200 mm was prepared, which was provided with grooves having a depth of 950 Å and a half-value width of 0.3 μm, formed by use of a 50 μm thick photopolymer at intervals of a track pitch of 1.6 μm in a 45-94 mm radius range of the substrate.

A mixture of a dye having the following formula and the dithiolate nickel complex No. 2 obtained in Synthesis Example 2 at a mixing ratio by weight of 80 to 20 was dissolved in 1,2-dichloroethane, so that a coating solution for a recording layer was prepared.

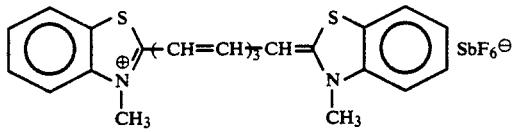

The thus prepared coating solution was coated on the substrate by spin coating, whereby a recording layer having a thickness of 700 Å was formed on the substrate. Thus, an optical information recording medium No. 5 according to the present invention was obtained.

EXAMPLE 6

A mixture of a dye having the following formula and the dithiolate nickel complex No. 3 obtained in Synthesis Example 3 at a mixing ratio by weight of 90 to 10 was dissolved in 1,2-dichloroethane, so that a coating solution for a recording layer was prepared.

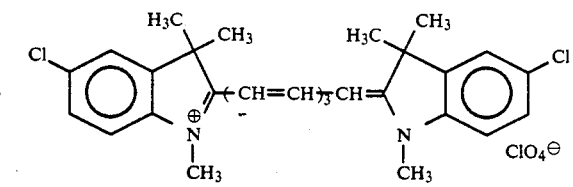

The thus prepared coating solution was coated on a substrate, which was prepared by the same procedure as in Example 5, by spin coating, whereby a recording layer having a thickness of 700 Å was formed on the substrate. Thus, an optical information recording medium No.6 according to the present invention was obtained.

EXAMPLE 7

Example 5 was repeated except that the dye employed in the preparation of the coating solution of the recording layer in Example 5 was replaced by a dye having the following formula, whereby an optical information recording medium No. 7 according to the present invention was obtained.

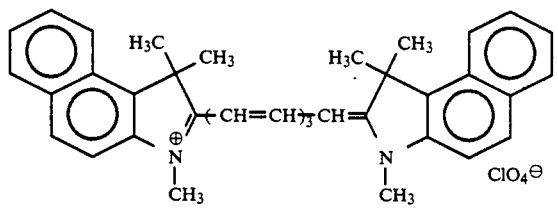

EXAMPLE 8

A mixture of a dye having the following formula and the dithiolate nickel complex No. 4 obtained in Synthesis Example 4 at a mixing ratio by weight of 90 to 10 was dissolved in 1,2-dichloroethane, so that a coating solution for a recording layer was prepared.

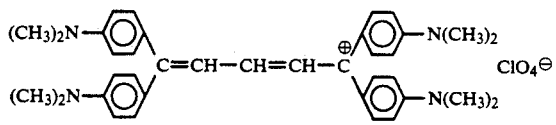

The thus prepared coating solution was coated on a substrate, which was prepared by the same procedure as in Example 5, by spin coating, whereby a recording layer having a thickness of 700 Å was formed on the substrate. Thus, an optical information recording medium No. 8 according to the present invention was obtained.

EXAMPLE 9

A polymethyl methacrylate substrate having a thickness of 1.2 mm and a diameter of 200 mm was prepared, which was provided with grooves having a depth of 950 Å and a half-value width of 0.3 μm, formed by use of a 50 μm thick photopolymer, at intervals of a track pitch of 1.6μm in a 45-94 mm radius range of the substrate.

A mixture of a dye having the following formula and the dithiolate nickel complex No.3 obtained in Synthesis Example 3 at a mixing ratio by weight of 90 to 10 was dissolved in 1,2-dichloroethane, so that a coating solution for a recording layer was prepared.

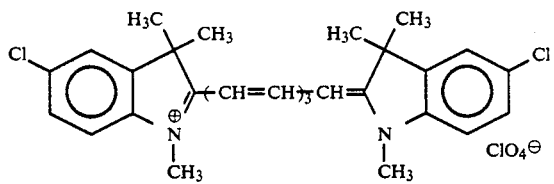

The thus prepared coating solution was coated on the above substrate by spin coating, whereby a recording layer having a thickness of 500 Å was formed on the substrate.

On the thus obtained recording layer, the following dye was deposited in vacuum, so that an overcoat layer having a thickness of 150 Å was formed on the above recording layer.

recording layer in Example 6 was replaced by a commercially available dithiolate nickel complex (Trademark "PA1007" made by Mitsui Toatsu Fine Chemicals Inc.) having the following formula, whereby a comparative optical information recording medium No. 5 was obtained.

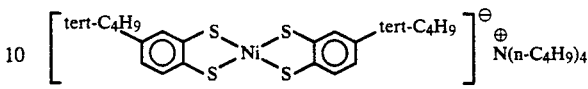

A semiconductor laser beam having a wavelength of 790 nm was applied to a substrate side of each of the above-prepared optical information recording media No. 1 to No. 9 according to the present invention and comparative optical information recording media No. 1 to No. 5 at a recording frequency of 0.5 MHz and at a linear speed of 1.5 m/sec in order to write information

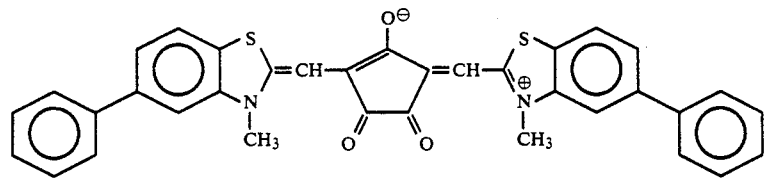

Thus, an optical information recording medium No. 9 according to the present invention was obtained.

COMPARATIVE EXAMPLE 3

Example 6 was repeated except that dithiolate nickel complex No. 3 was eliminated from the coating solution for the recording layer employed in Example 6, whereby a comparative optical information recording medium No. 3 was obtained.

COMPARATIVE EXAMPLE 4

Example 8 was repeated except that dithiolate nickel complex No. 4 was eliminated from the coating solution for the recording layer employed in Example 8, whereby a comparative optical information recording medium No. 4 was obtained.

COMPARATIVE EXAMPLE 5

Example 6 was repeated except that dithiolate nickel complex No. 3 employed in the coating solution for the therein and to reproduce the recorded information therefrom. A reproduction waveform obtained from each recording medium was subjected to spectral analysis, using a scanning filter at a band width of 30 KHz, so that the C/N (Carrier/Noise) ratio of each recording medium was measured.

Furthermore each recording medium was subjected to a forced reproduction-deterioration test by each of the above-mentioned optical information recording media being illuminated by a tungusten lamp having an illumination of 54000 lux for 20 hours, and then the reflectance of each recording layer of the medium and C/N ratio were respectively measured.

Each of the above-mentioned optical information recording media was subjected to a forced preservability-deterioration test by allowing each recording medium to stand for 1000 hours at 60° C. and 90%RH. Then the reflectance of each recording layer of the medium and the C/N ratio were also measured.

The results are shown in the following Table 4.

TABLE 4

| | Initial Values | | After Forced Reproduction-deterioration Test | | After Forced Preservability-deterioration Test | |
|---|---|---|---|---|---|---|
| | Reflectance % | C/N db | Reflectance % | C/N db | Reflectance % | C/N db |
| Example 1 | 20 | 54 | 16 | 48 | 15 | 47 |
| Example 2 | 21 | 56 | 18 | 51 | 17 | 52 |
| Example 3 | 20 | 56 | 17 | 52 | 18 | 54 |
| Example 4 | 20 | 55 | 17 | 50 | 16 | 50 |
| Example 5 | 27 | 54 | 22 | 50 | 21 | 50 |
| Example 6 | 27 | 55 | 22 | 51 | 20 | 51 |
| Example 7 | 26 | 54 | 19 | 50 | — | — |
| Example 8 | 23 | 54 | 19 | 50 | — | — |
| Example 9 | 27 | 55 | 20 | 50 | — | — |
| Comparative Example 1 | 20 | 47 | 15 | 41 | 12 | 35 |
| Comparative Example 2 | 21 | 55 | 7 | * | — | — |
| Comparative Example 3 | 27 | 56 | 10 | * | — | — |
| Comparative | 27 | 55 | 11 | * | — | — |

TABLE 4-continued

|  | Initial Values | | After Forced Reproduction-deterioration Test | | After Forced Preservability-deterioration Test | |
| --- | --- | --- | --- | --- | --- | --- |
|  | Reflectance % | C/N db | Reflectance % | C/N db | Reflectance % | C/N db |
| Example 4 Comparative Example 5 | 26 | 55 | 19 | 47 | 17 | 40 |

*Unmeasurable

As apparent from the above tests, the optical information recording media according to the present invention show improved stability to heat and light, and preservability. There is substantially no deterioration in the recording and reproduction performance of the optical information recording media according to the present invention in the course of repeated use thereof.

In addition, the optical information recording media according to the present invention can record information with high sensitivity and form bits in an appropriate shape when long-wavelength laser beams such as a semiconductor laser beams are employed for writing and reproduction of information.

What is claimed is:

1. A dithiolate nickel complex compound having the formula (II):

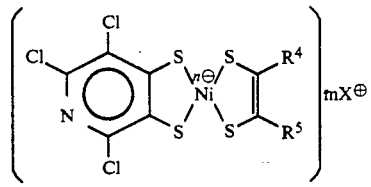

(II)

wherein $R^4$ and $R^5$ each independently represent hydrogen, an alkyl group having 1 to 6 carbon atoms, an aryl group or a cyano group, or $R^4$ and $R^5$, together with the carbons to which they are attached form a pyridinyl ring; X represents a cation; wherein n and m both equal 1.

2. The complex compound of claim 1, wherein said cation is selected from the group consisting of quaternary ammonium salt cations, quaternary phosphonium salt cations and sodium.

3. The complex compound of claim 1, wherein said alkyl group is selected from the group consisting of methyl, ethyl, propyl and t-butyl.

4. The complex compound of claim 1, wherein both $R^4$ and $R^5$ are cyano.

5. A dithiolate nickel complex compound having the formula (II):

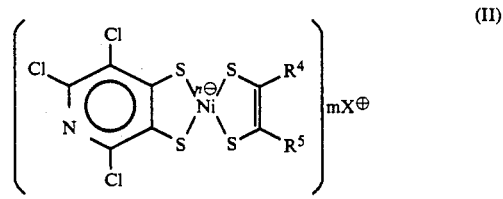

(II)

wherein $R^4$ and $R^5$ each independently represent hydrogen, an alkyl group having 1 to 6 carbon atoms, and aryl group, a cyano group or diemthylaminophenyl, provided at least one of $R^4$ and $R^5$ is diemthylaminophenyl; X represents a cation; wherein n and m both equal 1.

* * * * *

UNITED STATES PATENT AND TRADEMARK OFFICE
CERTIFICATE OF CORRECTION

PATENT NO. : 5,145,963
DATED : September 8, 1992
INVENTOR(S) : Kazukiyo Nagai It is certified that error appears in the above-identified patent and that said Letters Patent is hereby corrected as shown below:

Column 2, line 15, delete "absording", insert --absorbing--.

Column 3, line 10, delete "R3", insert --$R^3$--.

Column 7, line 56, delete "has", insert --have--.

Column 10, line 55, delete "[I)", insert --(I).

Column 12, line 44, delete "costructed", insert --constructed--.

Column 21, line 22, after "as", delete "a".

Column 22, line 38, delete "diemthylaminophenyl", insert --dimethylaminophenyl--;
line 39, delete "diemthylaminophenyl", insert --dimethylaminophenyl--.

Signed and Sealed this

Sixth Day of July, 1993

*Attest:*

MICHAEL K. KIRK

*Attesting Officer*     Acting Commissioner of Patents and Trademarks